US012643519B2

(12) United States Patent (10) Patent No.: US 12,643,519 B2
Penner et al. (45) Date of Patent: Jun. 2, 2026

(54) METHOD AND DEVICE FOR ASCERTAINING A CLAMPING FORCE OF A BRAKING UNIT OF A MOTOR VEHICLE

(71) Applicants:Robert Bosch GmbH, Stuttgart (DE); Hitachi Astemo France, Drancy (FR)

(72) Inventors: Sascha Penner, Beilstein (DE); Jakob Brandauer, Stuttgart (DE); Oliver Marquardt, Stuttgart (DE)

(73) Assignees: ROBERT BOSCH GMBH, Stuttgart (DE); HITACHI ASTEMO FRANCE, Drancy (FR)

( * ) Notice: Subject to any disclaimer, the term of this patent is extended or adjusted under 35 U.S.C. 154(b) by 565 days.

(21) Appl. No.: 18/004,807

(22) PCT Filed: Jun. 23, 2021

(86) PCT No.: PCT/EP2021/067114
§ 371 (c)(1),
(2) Date: Feb. 3, 2023

(87) PCT Pub. No.: WO2022/012886
PCT Pub. Date: Jan. 20, 2022

(65) Prior Publication Data
US 2023/0249657 A1 Aug. 10, 2023

(30) Foreign Application Priority Data
Jul. 15, 2020 (DE) ..................... 10 2020 208 853.5

(51) Int. Cl.
*B60T 13/74* (2006.01)
(52) U.S. Cl.
CPC .......... *B60T 13/741* (2013.01); *B60T 13/746* (2013.01)

(58) Field of Classification Search
CPC ..... B60T 13/74–748; B60T 8/17–1769; B60T 17/22–228
See application file for complete search history.

(56) References Cited

U.S. PATENT DOCUMENTS

2017/0321773 A1 11/2017 Lee et al.
2021/0394735 A1* 12/2021 Jang ..................... B60T 13/746

FOREIGN PATENT DOCUMENTS

CN 106043292 A 10/2016
CN 106167013 A 11/2016
(Continued)

OTHER PUBLICATIONS

Translation of KR 2013 0054051 A (Year: 2013).*
International Search Report for PCT/EP2021/067114, Issued Sep. 24, 2021.

*Primary Examiner* — David R Morris
(74) *Attorney, Agent, or Firm* — NORTON ROSE FULBRIGHT US LLP

(57) ABSTRACT

A method for ascertaining a clamping force of a braking unit of a motor vehicle, which includes at least one rotatably mounted wheel and a braking system including at least one braking unit and at least one electric motor. The electric motor includes a motor winding and a rotatably mounted rotor. The rotor is coupled with the brake body so that a clamping force may be generated by a rotation of the rotor, by which a brake body is pressed against a brake element. A rotation angle of the rotor and/or a displacement travel of a displaceably mounted element of the transmission unit is ascertained, and a level of the generated clamping force is ascertained as a function thereof. A level of the clamping force is ascertained as a function of the level of a motor current.

9 Claims, 4 Drawing Sheets

(56) References Cited

FOREIGN PATENT DOCUMENTS

| CN | 110099827 | A | 8/2019 |
|----|-----------|-----|---------|
| DE | 10005758 | A1 | 8/2001 |
| DE | 102011004772 | A1 | 8/2012 |
| EP | 3156294 | A1 | 4/2017 |
| JP | 2016222134 | A | 12/2016 |
| KR | 101338433 | B1 | 12/2013 |
| WO | 2015146775 | A1 | 10/2015 |

* cited by examiner

METHOD AND DEVICE FOR ASCERTAINING A CLAMPING FORCE OF A BRAKING UNIT OF A MOTOR VEHICLE

FIELD

The present invention relates to a method for ascertaining a clamping force of a braking unit of a motor vehicle, the motor vehicle including at least one rotatably mounted wheel and a braking system including at least one braking unit and at least one electric motor, the braking unit including a brake element connected in a rotationally-fixed manner to the wheel and at least one brake body pressable against the brake element, the electric motor including a motor winding and a rotatably mounted rotor, the rotor being coupled by a transmission unit to the brake body in such a way that a clamping force may be generated by a rotation of the rotor, by which the brake body is pressed against the brake element, the rotor being rotatable by applying an electrical motor current to the motor winding, a rotation angle of the rotor and/or a displacement travel of a displaceably mounted element of the transmission unit being ascertained, and a level of the generated clamping force being ascertained as a function of the rotation angle and/or the displacement travel.

In addition, the present invention relates to a method for operating a motor vehicle.

Furthermore, the present invention relates to a device for ascertaining a clamping force, including an evaluation device.

BACKGROUND INFORMATION

A motor vehicle typically has multiple rotatably mounted wheels. To reduce a travel velocity of the motor vehicle, the motor vehicle generally includes a braking system including at least one braking unit. The braking unit is associated with one of the wheels of the motor vehicle and is designed to generate a friction braking torque, by which a present rotational speed of the wheel is reduced. For this purpose, the braking unit includes a brake element connected in a rotationally-fixed manner to the wheel, for example, a brake disc, and at least one brake body pressable against the brake element. If the brake body is pressed against the brake element, the friction braking torque is thus generated. The braking system preferably includes multiple braking units, each of the braking units being assigned to a different one of the wheels.

Braking systems more and more frequently additionally include an electric motor, in particular including a multi-phase motor winding and a rotatably mounted rotor, for actuating the braking unit. The rotor is coupled by a transmission unit with the brake body in such a way that a clamping force may be generated by a rotation of the rotor, by which the brake body is pressed against the brake element. The rotation of the rotor is thus converted by the transmission unit into a displacement of the brake body. A level of the generated clamping force corresponds to a level of the friction braking torque. The higher the clamping force is, the higher the friction braking torque is also. The rotor is rotatable by applying an electric motor current to the motor winding.

Methods for ascertaining the level of the generated clamping force are available in the related art. The knowledge of the clamping force enables an advantageous regulation of the electric motor. Ascertaining a rotation angle of the rotor and/or a displacement travel of a displaceably mounted element of the transmission unit is described in the related art. The rotation angle and the displacement travel correspond to the level of the clamping force. The greater the rotation angle or the displacement travel is, the greater the generated clamping force is also. The level of the clamping force is then accordingly ascertained as a function of the rotation angle and/or the displacement travel.

SUMMARY

A method according to the present invention may have the advantage that the accuracy with which the level of the generated clamping force is ascertained is increased. It is provided for this purpose according to an example embodiment of the present invention that a level of the motor current is ascertained, and the level of the clamping force is ascertained as a function of the level of the motor current. In transmission units subject to slip, solely considering the rotation angle and/or the displacement travel results in inaccuracies in the ascertainment of the level of the generated clamping force with increasing absolute rotation angle or displacement travel. These inaccuracies are at least partially compensated for by the additional consideration of the level of the motor current. The level of the motor current also corresponds at least in certain operating points of the electric motor to the level of the generated clamping force. For example, the clamping force increases with an increase of the motor current. The motor current is preferably detected or measured. This is also to be understood as ascertaining the motor current. A sensor unit is thus provided, which is designed to detect the level of the motor current. Alternatively thereto, a parameter is preferably detected or measured which corresponds to the level of the motor current, for example, an electrical motor voltage of the motor winding. The level of the motor current is then ascertained as a function of the detected parameter.

According to one preferred specific embodiment of the present invention, it is provided that the level of the clamping force is ascertained as a function of a first characteristic curve, which describes the clamping force as a function of the rotation angle or the displacement travel. The generated clamping force is ascertainable precisely on the basis of the first characteristic curve. A large number of rotation angles or displacement travels may each be associated with a corresponding clamping force with the aid of the first characteristic curve.

According to an example embodiment of the present invention, the first characteristic curve is preferably changed as a function of the ascertained level of the motor current. A consideration of the level of the motor current which is simple with respect to evaluation technology is achieved in this way. For example, a slope of the first characteristic curve is changed as a function of the ascertained level of the motor current.

According to one preferred specific embodiment of the present invention, it is provided that, as a function of the level of the motor current, on the one hand, and the ascertained rotation angle, on the other hand, a corrected rotation angle is ascertained, the level of the clamping force being ascertained as a function of the corrected rotation angle and/or that, as a function of the level of the motor current, on the one hand, and the ascertained displacement travel, on the other hand, a corrected displacement travel is ascertained, the level of the clamping force being ascertained as a function of the corrected displacement travel. The originally ascertained rotation angle or the originally ascertained displacement travel is thus corrected as a function of the ascertained level of the motor current. For example, a correction factor is ascertained as a function of the level of the motor current and the ascertained rotation angle or the ascertained displacement travel is multiplied for correction by the correction factor. The ascertainment of the level of the clamping force is then accordingly based on the corrected rotation angle or the corrected displacement travel. For example, the level of the clamping force is ascertained as a function of the corrected rotation angle or the corrected displacement travel with the aid of the first characteristic curve.

According to one preferred specific embodiment of the present invention, it is provided that, as a function of the level of the motor current and a second characteristic curve, which describes a clamping force transmission of the braking unit as a function of the level of the motor current, a current-based clamping force is ascertained, the first characteristic curve being changed as a function of the current-based clamping force, and/or the corrected rotation angle and/or the corrected displacement travel being ascertained as a function of the current-based clamping force. Due to the use of the second characteristic curve, a precise consideration of the ascertained level of the motor current when ascertaining the clamping force is achieved. With the aid of the second characteristic curve, a large number of motor current values may each be associated with a corresponding clamping force transmission. The current-based clamping force can then be ascertained, for example, with the aid of the equation $$F_{clamp,I} = K_{F,I}(I_{mot}) \times I_{mot}$$

$F_{clamp,I}$ describing the current-based clamping force, $K_{F,I}$ describing the clamping force transmission, and $I_{mot}$ describing the ascertained motor current.

According to an example embodiment of the present invention, it is preferably monitored whether a correction situation is present, the first characteristic curve only being changed as a function of the level of the motor current if the correction situation is present, and/or the corrected rotation angle and/or the corrected displacement travel only being ascertained if the correction situation is present. A correction situation is to be understood as a situation in which it is to be presumed that a desired accuracy increase is achieved in the ascertainment of the level of the generated clamping force by the consideration of the level of the motor current. If the correction situation is not present, the ascertained level of the motor current preferably remains unconsidered in the ascertainment of the level of the generated clamping force.

According to one preferred specific embodiment of the present invention, it is provided that a rotational speed threshold is predefined, if a rotational speed of the rotor falling below the rotational speed threshold is present, it being established that the correction situation is present, and/or a displacement speed threshold is predefined, if a displacement speed of the element falling below the displacement speed threshold is present, it being established that the correction situation is present. It is presumed that the correction situation is present if the braking unit or the electric motor is in a static state, thus when the state of the braking unit and the electric motor no longer changes or only changes slightly. This may be established reliably on the basis of the rotational speed or the displacement speed.

A current change threshold is preferably predefined, upon the presence of a motor current change falling below the current change threshold, it being established that the correction situation is present. As mentioned above, the correction situation is present when the electric motor is in a static state. Accordingly, the presence of the correction situation may also be established reliably as a function of the motor current change of the motor current.

The present invention additionally relates to a method for operating a motor vehicle, the motor vehicle including at least one rotatably mounted wheel and a braking system including at least one braking unit and at least one electric motor, the braking unit including a brake element connected in a rotationally-fixed manner to the wheel and at least one brake body pressable against the brake element, the electric motor including a motor winding and a rotatably mounted rotor, the rotor being coupled by a transmission unit to the brake body in such a way that a clamping force may be generated by a rotation of the rotor, by which the brake body is pressed against the brake element, the rotor being rotatable by applying an electric motor current to the motor winding, a level of the generated clamping force being ascertained, and the motor current being applied to the motor winding in such a way that the generated clamping force corresponds to a predefined setpoint clamping force. In the method for operating the motor vehicle, the level of the clamping force is ascertained by the method according to the present invention for ascertaining the clamping force. The above-mentioned advantages also result therefrom. Further preferred features and combinations of features result from the disclosure herein.

A device according to the present invention for ascertaining a clamping force of a braking unit of a motor vehicle, the motor vehicle including at least one rotatably mounted wheel and a braking system including at least one braking unit and at least one electric motor, the braking unit including a brake element connected in a rotationally-fixed manner to the wheel and at least one brake body pressable against the brake element, the electric motor including a motor winding and a rotatably mounted rotor, the rotor being coupled by a transmission unit to the brake body in such a way that a clamping force may be generated by a rotation of the rotor, by which the brake body is pressed against the brake element, the rotor being rotatable by applying an electric motor current to the motor winding, includes an evaluation device which is specially configured to carry out the method according to the present invention for ascertaining the clamping force when used as intended. The above-mentioned advantages also result therefrom. Further preferred features and combinations of features result from the disclosure herein.

According to one preferred specific embodiment of the present invention, the transmission unit is coupled directly to the brake body. The displaceably mounted element or a further displaceably mounted element of the transmission unit is therefore axially applied directly to the brake body at least upon an actuation of the braking unit with respect to a displacement axis, along which the brake body is displaceable. A hydraulic connection between the transmission unit and the brake body is omitted. For example, the transmission unit has a planetary rolling gear transmission, the displaceably mounted element then being a planetary roller spindle drive. A different braking unit is typically associated with each of multiple wheels of the motor vehicle. A different electric motor and a different transmission unit is then preferably associated with each of the braking units. The evaluation device is then designed to ascertain the clamping forces generated by the various electric motors with the aid of the method according to the present invention.

According to another preferred specific embodiment of the present invention, the transmission unit is coupled to a master brake cylinder of the braking system in such a way that upon application of the motor current to the motor winding, a hydraulic piston displaceably mounted in the master brake cylinder is actuated. The master brake cylinder is fluidically connected to the brake body in such a way that the brake body is pressed against the brake element upon an actuation of the hydraulic piston. The transmission unit is thus coupled indirectly with the brake body according to this specific embodiment.

The present invention is explained in greater detail hereinafter on the basis of the figures.

DETAILED DESCRIPTION OF EXAMPLE EMBODIMENTS

Figure 1:
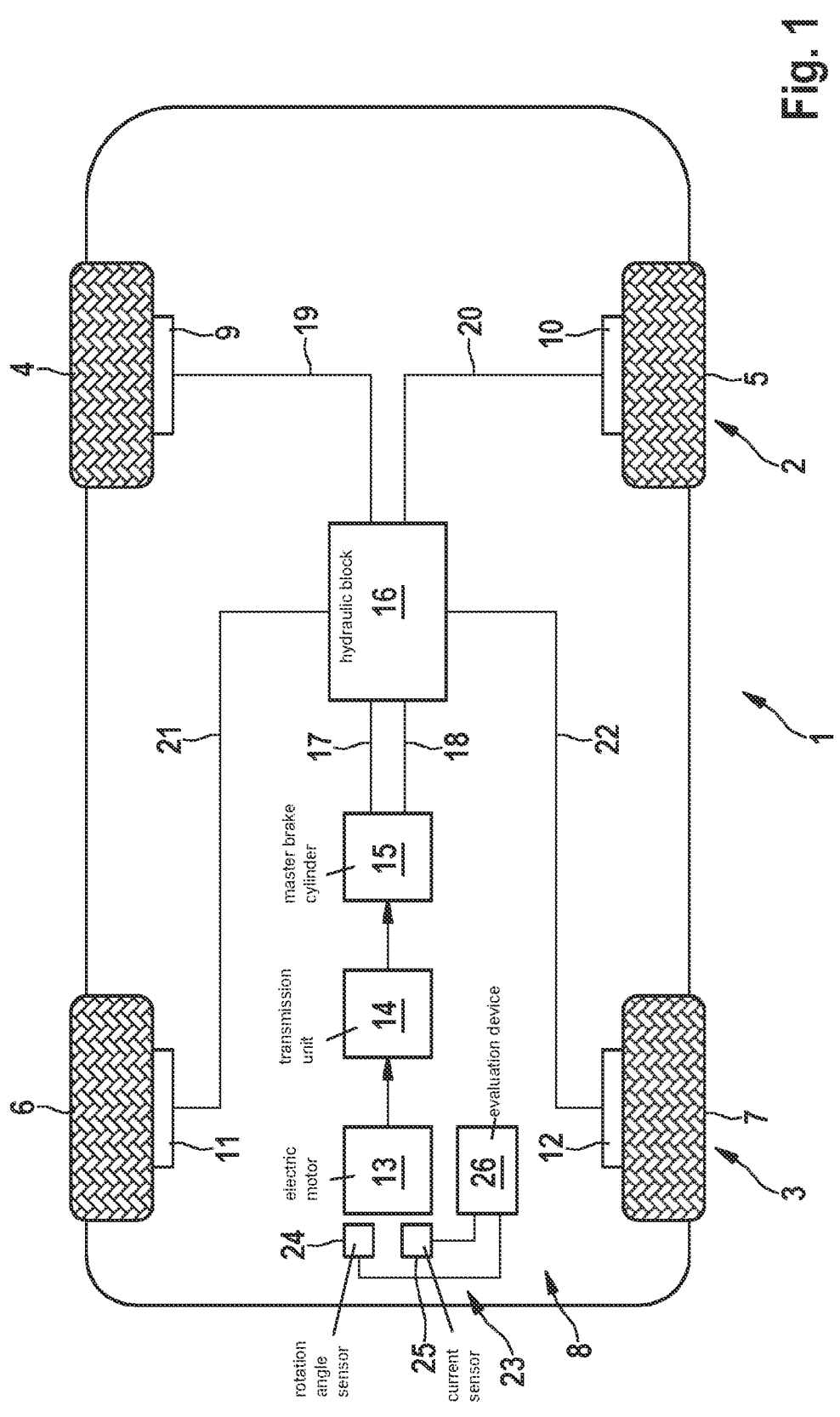
FIG. 1 shows a motor vehicle in a simplified representation, according to an example embodiment of the present invention.

FIG. 1 shows a motor vehicle 1 in a simplified representation. Motor vehicle 1 includes a front wheel axle 2 and a rear wheel axle 3. Front wheel axle 2 includes a rotatably mounted first wheel 4 and a rotatably mounted second wheel 5. Rear axle 3 includes a rotatably mounted third wheel 6 and a rotatably mounted fourth wheel 7.

Motor vehicle 1 additionally includes a braking system 8. Braking system 8 includes a number of braking units 9, 10, 11, and 12 corresponding to the number of the wheels. Braking units 9, 10, 11, and 12 are only schematically shown in FIG. 1. A different one of braking units 9, 10, 11, or 12 is associated with each of wheels 4, 5, 6, and 7. Braking units 9, 10, 11, and 12 are designed to generate a friction braking torque in order to reduce the rotational speed of the wheel with which they are associated. For example, a first braking unit 9 of the braking units is designed to reduce the present rotational speed of first wheel 4. For this purpose, first braking unit 9 has a brake element connected in a rotationally-fixed manner to first wheel 4 and at least one brake body pressable against the brake element. Braking units 10, 11, and 12 correspond with respect to their design to first braking unit 9. Braking units 10, 11, and 12 each also include a brake element and at least one brake body, which is pressable against the brake element.

Braking system 8 additionally includes an electric motor 13. Electric motor 13 is also only schematically shown in FIG. 1. Electric motor 13 includes a rotatably mounted rotor and a motor winding. The rotor is rotatable by applying an electrical motor current $I_{mot}$ to the motor winding.

The rotor is coupled to a transmission unit 14. Transmission unit 14 includes at least one displaceably mounted element and is designed to convert a rotation of the rotor into a displacement of the displaceably mounted element. For example, transmission unit 14 includes a spindle gear for this purpose including a rotatably mounted spindle nut and a displaceably mounted spindle.

Braking system 8 additionally includes a master brake cylinder 15. In the present case, master brake cylinder 15 is designed as a tandem master brake cylinder 15, so that two hydraulic pistons are displaceably mounted in master brake cylinder 15. The rotor is coupled by transmission unit 14 to master brake cylinder 15 in such a way that the hydraulic pistons are displaceable by a rotation of the rotor.

Braking system 8 additionally includes a hydraulic block 16. Master brake cylinder 15 is fluidically connected by two input lines 17 and 18 to hydraulic block 16. Hydraulic block 16 is in turn fluidically connected by four output lines 19, 20, 21, and 22 to the wheel brake cylinders of braking units 9, 10, 11, and 12. If the hydraulic pistons are displaced in an actuation direction, a clamping force $F_{clamp}$ acting on the brake body is thus generated by a hydraulic fluid present in lines 17, 18, 19, 20, 21, and 22, by which the brake bodies are pressed against the particular brake elements.

Because the rotor is coupled by transmission unit 14 to the hydraulic piston, the clamping force may be generated by the rotation of the rotor. A level of the generated clamping force then corresponds to a rotation angle p of the rotor and a displacement travel of the displaceably mounted element. The greater rotation angle $\varphi$ is, the higher generated clamping force $F_{clamp}$ is also. Furthermore, the level of generated clamping force $F_{clamp}$ corresponds to the level of the friction braking torque. The higher clamping force $F_{clamp}$ is, the higher the friction braking torque is also.

Motor vehicle 1 additionally includes a device 23. Device 23 includes a rotation angle sensor 24, which is associated with the rotor and is designed to detect rotation angle $\varphi$ of the rotor. Device 23 additionally includes a current sensor 25, which is associated with the motor winding and is designed to detect the level of electric motor current $I_{mot}$ flowing through the motor winding. Moreover, device 23 includes an evaluation device 26. Evaluation device 26 is connected for communication to rotation angle sensor 24 and current sensor 25, so that detected rotation angle $\varphi$ and the level of motor current $I_{mot}$ are provided to evaluation device 26. Evaluation device 26 is designed to ascertain the level of generated clamping force $F_{clamp}$ as a function of rotation angle $\varphi$ of the rotor, on the one hand, and the level of motor current $I_{mot}$, on the other hand.

Evaluation device 26 is additionally designed to ascertain activation signals for switches of a power electronics unit of electric motor 13 and to activate the switches as a function of the activation signals. Evaluation device 26 is designed as a control unit 26. If a friction braking torque is to be generated by braking units 9, 10, 11, and 12, evaluation device 26 activates the power electronics unit of electric motor 13 in a regulated manner in such a way that generated clamping force $F_{clamp}$ corresponds to a predefined setpoint clamping force.

Electric motor current $I_{mot}$ is thus applied to the motor winding in such a way that generated clamping force $F_{clamp}$ corresponds to the predefined setpoint clamping force. For example, the setpoint clamping force is predefined by actuation of a brake pedal of motor vehicle 1 by a driver of motor vehicle 1.

Figure 2:
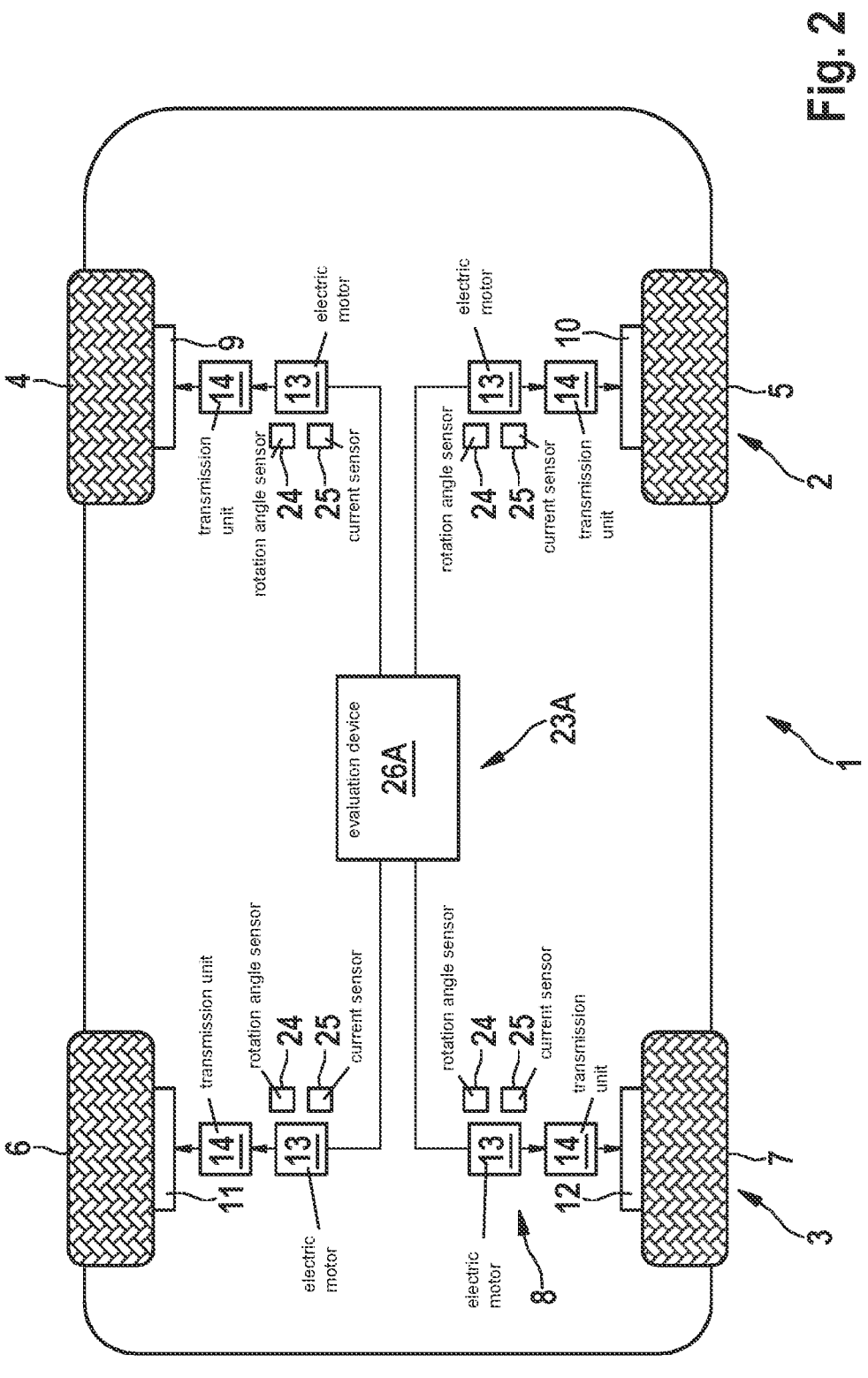
FIG. 2 shows a further motor vehicle in a simplified representation, according to an example embodiment of the present invention.

FIG. 2 shows another exemplary embodiment of motor vehicle 1. Motor vehicle 1 shown in FIG. 2 differs from motor vehicle 1 shown in FIG. 1 with regard to the design of braking system 8. The motor vehicle shown in FIG. 2 also includes braking units 9, 10, 11, and 12.

Braking system 8 of motor vehicle 1 shown in FIG. 2 includes a number of electric motors 13 corresponding to the number of braking units 9, 10, 11, and 12. Moreover, braking system 8 includes a number of transmission units 14 corresponding to the number of braking units 9, 10, 11, and 12. Each braking unit 9, 10, 11, and 12 is associated with a different one of electric motors 13 and a different one of transmission units 14.

The rotors of electric motors 13 are also coupled by transmission units 14 with the brake bodies of braking units 9, 10, 11, and 12 in such a way that a clamping force $F_{clamp}$ may be generated by an application of a motor current $I_{mot}$ to the motor windings of electric motors 13, by which the brake bodies of braking units 9, 10, 11, and 12 are pressed against the particular brake elements. Transmission units 14 are each coupled directly to the brake bodies, thus without an interconnected master brake cylinder.

Device 23A of motor vehicle 1 shown in FIG. 2 includes a number of rotation angle sensors 24 corresponding to the number of electric motors 13, a different one of rotation angle sensors 24 being associated with each of electric motors 13.

Device 23A additionally includes a number of current sensors 25 corresponding to the number of electric motors 13, a different one of current sensors 25 being associated with each of electric motors 13.

Rotation angle sensors 24 and current sensors 25 are connected for communication to evaluation device 26A, so that rotation angles $\varphi$ detected by rotation angle sensors 24 and motor currents $I_{mot}$ detected by current sensors 25 are provided to evaluation device 26A.

Evaluation device 26A of motor vehicle 1 shown in FIG. 2 is designed to ascertain the level of clamping forces $F_{clamp}$ generated by electric motors 13 as a function of rotation angle p of the particular rotor, on the one hand, and the level of particular motor current $I_{mot}$, on the other hand.

Moreover, evaluation device 26A is designed to ascertain activation signals for switches of power electronics units of electric motors 13 and to activate the switches as a function of the activation signals. Evaluation device 26A is designed to activate electric motors 13 independently of one another.

Evaluation device 26A activates the power electronics units in such a way that clamping forces $F_{clamp}$ generated by electric motors 13 each correspond to the predefined setpoint clamping force, as described above with reference to evaluation device 26.

Figure 3:
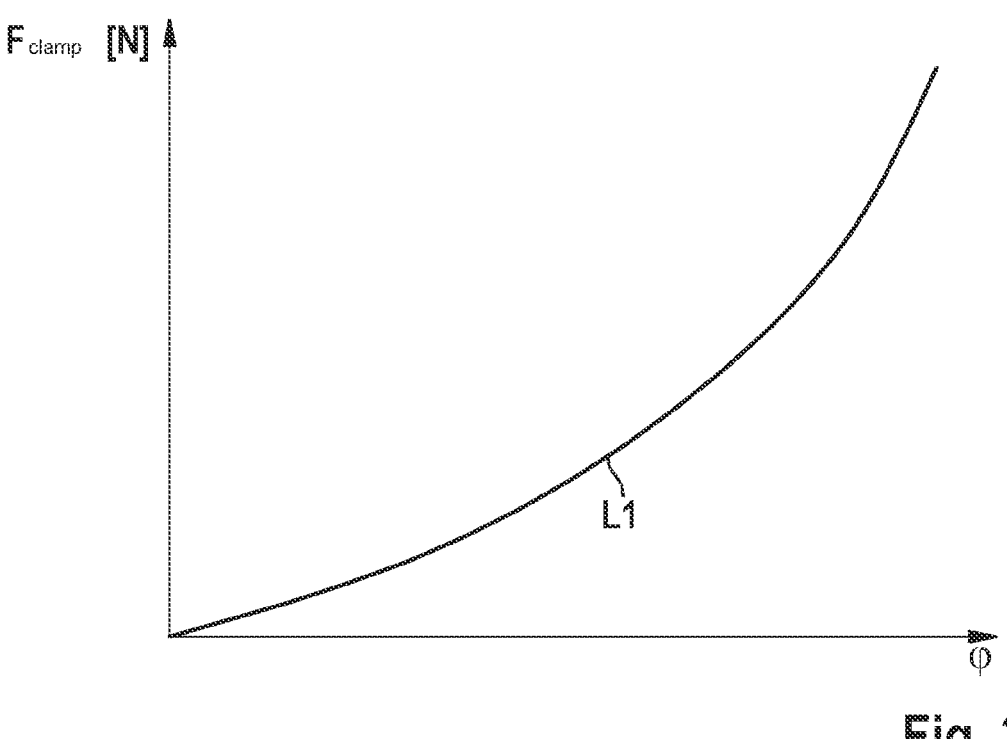
FIG. 3 shows a first characteristic curve, according to an example embodiment of the present invention.

FIG. 3 shows a first characteristic curve L1. First characteristic curve L1 describes the level of generated clamping force $F_{clamp}$ as a function of rotation angle $\varphi$ of the rotor. As is apparent from FIG. 3, clamping force $F_{clamp}$ increases with an increase of rotation angle $\varphi$.

Figure 4:
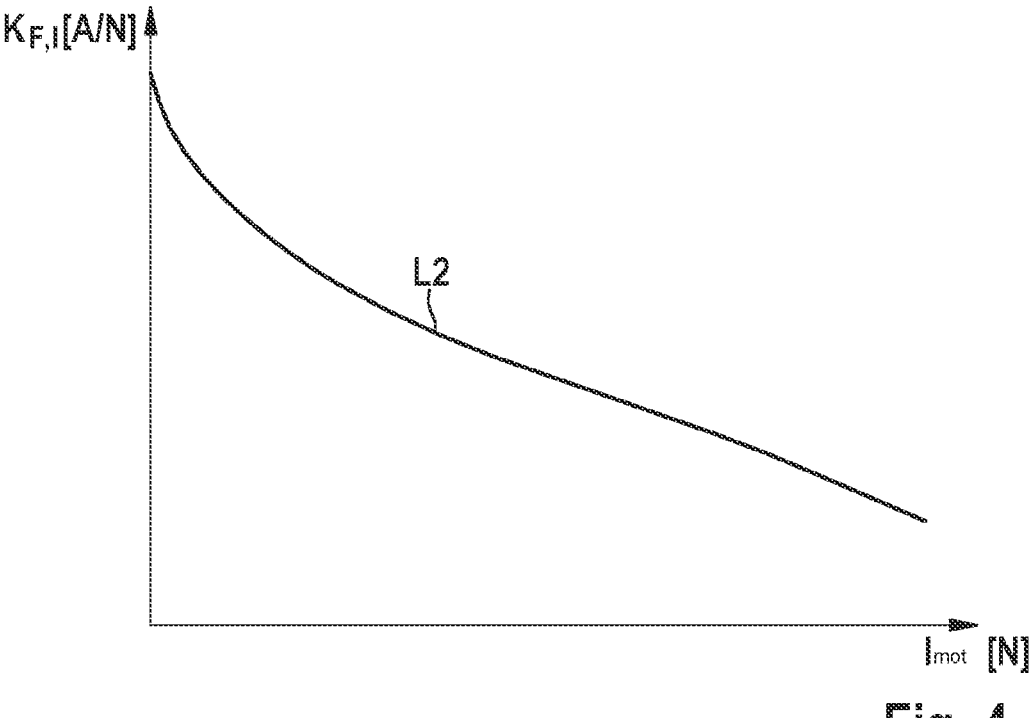
FIG. 4 shows a second characteristic curve, according to an example embodiment of the present invention.

FIG. 4 shows a second characteristic curve L2. Second characteristic curve L2 describes the level of a clamping force transmission $K_{F,I}$ of the braking units as a function of motor current $I_{mot}$. As is apparent from FIG. 4, clamping force transmission $K_{F,I}$ decreases with an increase of motor current $I_{mot}$.

As mentioned above, evaluation device 26 activates electric motor 13 in such a way that generated clamping force $F_{clamp}$ corresponds to the predefined setpoint clamping force. Accordingly, evaluation device 26A activates electric motors 13 in such a way that particular generated clamping force $F_{clamp}$ corresponds to the predefined setpoint clamping force.

Figure 5:
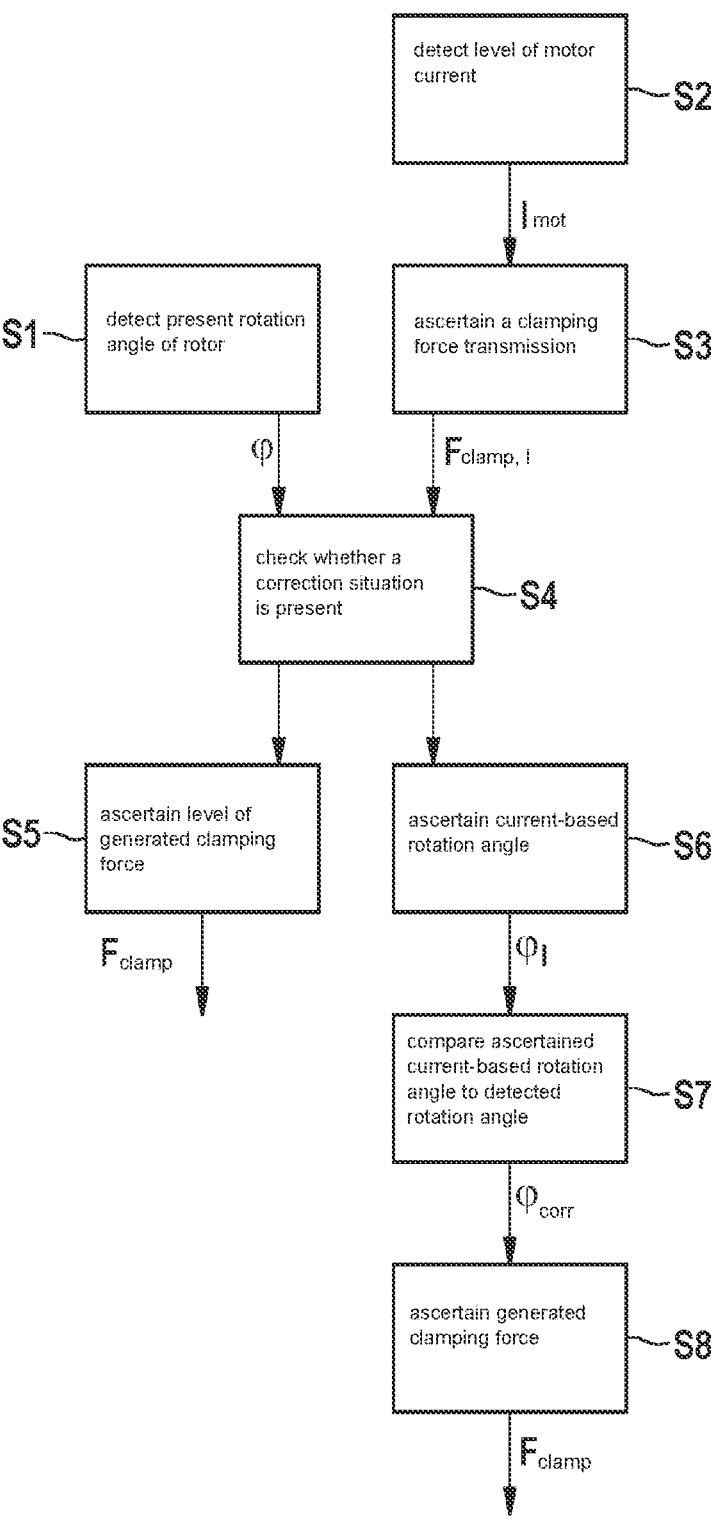
FIG. 5 shows a method for ascertaining a clamping force, according to an example embodiment of the present invention.

An advantageous method for ascertaining the level of generated clamping force $F_{clamp}$ is explained hereinafter with reference to FIG. 5. For this purpose, FIG. 5 shows the method on the basis of a flowchart. The method is described by way of example on the basis of evaluation device 26 of motor vehicle 1 shown in FIG. 1. However, evaluation device 26A of motor vehicle 1 shown in FIG. 2 is also designed to carry out the method and ascertain clamping force $F_{clamp}$ generated by each of electric motors 13 with the aid of the method.

In a first step S1, rotation angle sensor 24 detects present rotation angle $\varphi$ of the rotor. Moreover, rotation angle sensor 24 provides detected rotation angle $\varphi$ to evaluation device 26.

In a second step S2, current sensor 25 detects the level of motor current $I_{mot}$. Moreover, current sensor 25 provides the detected level of motor current $I_{mot}$ to evaluation device 26.

At least steps S1 and S2 are carried out continuously, so that a profile of rotation angle $\varphi$ and a profile of motor current $I_{mot}$ are provided to evaluation device 26.

In a third step S3, evaluation device 26 ascertains a clamping force transmission $K_{F,I}$ corresponding to the level of motor current $I_{mot}$ as a function of the level of motor current $I_{mot}$ with the aid of second characteristic curve L2. As a function of ascertained clamping force transmission $K_{F,I}$, evaluation device 26 then ascertains in step S3 a current-based clamping force $F_{clamp,I}$ with the aid of the equation $F_{clamp,I}=K_{F,I}(I_{mot})\times I_{mot}$.

In a fourth step S4, evaluation device 26 checks whether a correction situation is present. A correction situation is presumed if braking units 9, 10, 11, and 12 and electric motor 13 are in a static state. For this purpose, evaluation device 26 predefines a rotational speed threshold and a current change threshold. Moreover, evaluation device 26 ascertains a rotational speed of the rotor as a function of the profile of rotation angle $\varphi$ and a motor current change of motor current $I_{mot}$ as a function of the profile of motor current $I_{mot}$. Evaluation device 26 then establishes that the correction situation is present if the ascertained rotational speed of the rotor falls below the rotational speed threshold and the ascertained motor current change falls below the current change threshold.

If evaluation device 26 establishes in step S4 that the correction situation is not present, the sequence refers to a fifth step S5. In fifth step S5, evaluation device 26 then ascertains the level of generated clamping force $F_{clamp}$ as a function of rotation angle $\varphi$ detected in step S1 with the aid of first characteristic curve L1. The level of motor current $I_{mot}$ remains unconsidered.

However, if evaluation device 26 establishes in step S4 that the correction situation is present, the sequence refers to a sixth step S6. In sixth step S6, evaluation device 26 then ascertains, as a function of current-based clamping force $F_{clamp,I}$ ascertained in third step S3, a current-based rotation angle $\varphi_I$ of the rotor with the aid of first characteristic curve L1.

In a seventh step S7, evaluation device 26 compares current-based rotation angle $\varphi_I$ ascertained in step S6 to rotation angle p detected in step S1. If detected rotation angle $\varphi$ deviates from current-based rotation angle $\varphi_I$ evaluation device 26 thus corrects detected rotation angle $\varphi$. Evaluation device 26 thus ascertains a corrected rotation angle $\varphi_{corr}$. For example, a rotation angle falling below detected rotation angle $\varphi$ is ascertained as corrected rotation angle $\varphi_{corr}$ if current-based rotation angle $\varphi_I$ falls below detected rotation angle $\varphi$.

In an eighth step S8, evaluation device 26 then ascertains generated clamping force $F_{clamp}$ as a function of corrected rotation angle $\varphi_{corr}$ with the aid of first characteristic curve L1.

Evaluation device 26 preferably changes first characteristic curve L1 as a function of corrected rotation angle $\varphi_{corr}$. Evaluation device 26 thus ascertains a corrected first characteristic curve. If step S5 is carried out again, evaluation device 26 then ascertains generated clamping force $F_{clamp}$ as a function of detected rotation angle φ with the aid of the corrected first characteristic curve.

As mentioned above, rotation angle φ of the rotor corresponds to the displacement travel of the displaceably mounted element of transmission unit 14. According to another exemplary embodiment of the method, the displacement travel of the element is detected and is used instead of detected rotation angle φ as the basis of the ascertainment of generated clamping force $F_{clamp}$. For example, a first characteristic curve L1 is then used, which describes generated clamping force $F_{clamp}$ as a function of the displacement travel of the element.

What is claimed is:

1. A method for ascertaining a clamping force of a braking unit of a motor vehicle, the motor vehicle including at least one rotatably mounted wheel, and a braking system including at least one braking unit and at least one electric motor, the braking unit including a brake element connected in a rotationally-fixed manner to the wheel and at least one brake body pressable against the brake element, the electric motor including a motor winding and a rotatably mounted rotor, the rotor being coupled by a transmission unit with the brake body in such a way that a clamping force may be generated by a rotation of the rotor, by which the brake body is pressed against the brake element, the rotor being rotatable by applying an electric motor current to the motor winding, the method comprising the following steps:

ascertaining a rotation angle of the rotor and/or a displacement travel of a displaceably mounted element of the transmission unit;

ascertaining a level of the generated clamping force as a function of the rotation angle and/or the displacement travel;

ascertaining a level of the motor current; and ascertaining the level of the clamping force as a function of the level of the motor current, wherein it is monitored whether a correction situation exists in which the braking device and/or the electric motor are in a static state, and wherein:

only when the correction situation exists, depending on the level of the motor current and the ascertained rotation angle, a corrected rotation angle is determined and the level of the clamping force is determined as a function of the corrected rotation angle, and/or only when the correction situation exists, depending on the level of the motor current and the ascertained displacement, a corrected displacement is determined and the clamping force is determined as a function of the corrected displacement.

2. The method as recited in claim 1, wherein the level of the clamping force is ascertained as a function of a first characteristic curve, which describes the clamping force as a function of the rotation angle or the displacement travel.

3. The method as recited in claim 2, wherein the first characteristic curve is changed as a function of the level of the motor current.

4. The method as recited in claim 1, wherein, as a function of the level of the motor current and a second characteristic curve which describes a clamping force transmission of the braking unit as a function of the level of the motor current, a current-based clamping force is ascertained, i) the first characteristic curve being changed as a function of the current-based clamping force, and/or ii) the corrected rotation angle and/or the corrected displacement travel being ascertained as a function of the current-based clamping force.

5. The method as recited in claim 1, wherein it is monitored whether the correction situation is present, i) the first characteristic curve only being changed upon the presence of the correction situation as a function of the level of the motor current, and/or ii) the corrected rotation angle and/or the corrected displacement travel only being ascertained upon the presence of the correction situation.

6. A method for ascertaining a clamping force of a braking unit of a motor vehicle, the motor vehicle including at least one rotatably mounted wheel, and a braking system including at least one braking unit and at least one electric motor, the braking unit including a brake element connected in a rotationally-fixed manner to the wheel and at least one brake body pressable against the brake element, the electric motor including a motor winding and a rotatably mounted rotor, the rotor being coupled by a transmission unit with the brake body in such a way that a clamping force may be generated by a rotation of the rotor, by which the brake body is pressed against the brake element, the rotor being rotatable by applying an electric motor current to the motor winding, the method comprising the following steps:

ascertaining a rotation angle of the rotor and/or a displacement travel of a displaceably mounted element of the transmission unit;

ascertaining a level of the generated clamping force as a function of the rotation angle and/or the displacement travel;

ascertaining a level of the motor current; and ascertaining the level of the clamping force as a function of the level of the motor current, wherein the level of the clamping force is ascertained as a function of a first characteristic curve, which describes the clamping force as a function of the rotation angle or the displacement travel, wherein the first characteristic curve is changed as a function of the level of the motor current, wherein; i) as a function of the level of the motor current and the ascertained rotation angle, a corrected rotation angle is ascertained, the level of the clamping force being ascertained as a function of the corrected rotation angle, and/or ii) as a function of the level of the motor current and the ascertained displacement travel, a corrected displacement travel is ascertained, the level of the clamping force being ascertained as a function of the corrected displacement travel, wherein it is monitored whether a correction situation is present, i) the first characteristic curve only being changed upon the presence of the correction situation as a function of the level of the motor current, and/or ii) the corrected rotation angle and/or the corrected displacement travel only being ascertained upon the presence of the correction situation, wherein: i) a rotational speed threshold is predefined, upon a presence of a rotational speed of the rotor falling below the rotational speed threshold, it being established that the correction situation is present, and/or ii) a displacement speed threshold is predefined, upon a presence of a displacement speed of the element falling below the displacement speed threshold, it being established that the correction situation is present.

7. A method for ascertaining a clamping force of a braking unit of a motor vehicle, the motor vehicle including at least one rotatably mounted wheel, and a braking system including at least one braking unit and at least one electric motor, the braking unit including a brake element connected in a rotationally-fixed manner to the wheel and at least one brake body pressable against the brake element, the electric motor including a motor winding and a rotatably mounted rotor, the rotor being coupled by a transmission unit with the brake body in such a way that a clamping force may be generated by a rotation of the rotor, by which the brake body is pressed against the brake element, the rotor being rotatable by applying an electric motor current to the motor winding, the method comprising the following steps:

ascertaining a rotation angle of the rotor and/or a displacement travel of a displaceably mounted element of the transmission unit;

ascertaining a level of the generated clamping force as a function of the rotation angle and/or the displacement travel;

ascertaining a level of the motor current; and ascertaining the level of the clamping force as a function of the level of the motor current, wherein the level of the clamping force is ascertained as a function of a first characteristic curve, which describes the clamping force as a function of the rotation angle or the displacement travel, wherein the first characteristic curve is changed as a function of the level of the motor current, wherein; i) as a function of the level of the motor current and the ascertained rotation angle, a corrected rotation angle is ascertained, the level of the clamping force being ascertained as a function of the corrected rotation angle, and/or ii) as a function of the level of the motor current and the ascertained displacement travel, a corrected displacement travel is ascertained, the level of the clamping force being ascertained as a function of the corrected displacement travel, wherein it is monitored whether a correction situation is present, i) the first characteristic curve only being changed upon the presence of the correction situation as a function of the level of the motor current, and/or ii) the corrected rotation angle and/or the corrected displacement travel only being ascertained upon the presence of the correction situation, wherein a current change threshold is predefined, upon a presence of a motor current change falling below the current change threshold, it being established that the correction situation is present.

8. A method for operating a motor vehicle, the motor vehicle including at least one rotatably mounted wheel, and a braking system including at least one braking unit and at least one electric motor, the braking unit including a brake element connected in a rotationally-fixed manner to the wheel and at least one brake body pressable against the brake element, the electric motor including a motor winding and a rotatably mounted rotor, the rotor being coupled by a transmission unit with the brake body in such a way that a clamping force may be generated by a rotation of the rotor, by which the brake body is pressed against the brake element, the rotor being rotatable by applying an electric motor current to the motor winding, the method comprising:

ascertaining a level of the generated clamping force;

applying the motor current to the motor winding in such a way that the generated clamping force corresponds to a predefined setpoint clamping force;

ascertaining a rotation angle of the rotor and/or a displacement travel of a displaceably mounted element of the transmission unit;

ascertaining a level of the generated clamping force as a function of the rotation angle and/or the displacement travel;

ascertaining a level of the motor current; and

ascertaining the level of the clamping force as a function of the level of the motor current, wherein it is monitored whether a correction situation exists in which the braking device and/or the electric motor are in a static state, and wherein:

only when the correction situation exists, depending on the level of the motor current and the ascertained rotation angle, a corrected rotation angle is determined and the level of the clamping force is determined as a function of the corrected rotation angle, and/or only when the correction situation exists, depending on the level of the motor current and the ascertained displacement, a corrected displacement is determined and the clamping force is determined as a function of the corrected displacement.

9. A device for ascertaining a clamping force of a braking unit of a motor vehicle, the motor vehicle including at least one rotatably mounted wheel, and a braking system including at least one braking unit and at least one electric motor, the braking unit including a brake element connected in a rotationally-fixed manner to the wheel and at least one brake body pressable against the brake element, the electric motor including a motor winding and a rotatably mounted rotor, the rotor being coupled by a transmission unit with the brake body in such a way that a clamping force may be generated by a rotation of the rotor, by which the brake body is pressed against the brake element, the rotor being rotatable by applying an electric motor current to the motor winding, the device comprising:

an evaluation device configured to:

ascertain a rotation angle of the rotor and/or a displacement travel of a displaceably mounted element of the transmission unit;

ascertain a level of the generated clamping force as a function of the rotation angle and/or the displacement travel;

ascertain a level of the motor current; and ascertain the level of the clamping force as a function of the level of the motor current, wherein it is monitored whether a correction situation exists in which the braking device and/or the electric motor are in a static state, and wherein:

only when the correction situation exists, depending on the level of the motor current and the ascertained rotation angle, a corrected rotation angle is determined and the level of the clamping force is determined as a function of the corrected rotation angle, and/or only when the correction situation exists, depending on the level of the motor current and the ascertained displacement, a corrected displacement is determined and the clamping force is determined as a function of the corrected displacement.

\* \* \* \* \*